(12) United States Patent
Senguttuvan et al.

(10) Patent No.: US 11,580,513 B2
(45) Date of Patent: Feb. 14, 2023

(54) PHYSICAL STAND FOR MULTIPLE DEVICE ORIENTATIONS AND PERIPHERAL CARD READER

(71) Applicant: PayPal, Inc., San Jose, CA (US)

(72) Inventors: Guhan Senguttuvan, San Jose, CA (US); Satish Govindarajan, Los Altos, CA (US); Carlos Manuel Rivas, Redwood City, CA (US); Anantharaj Uruthiralingam, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 257 days.

(21) Appl. No.: 16/858,091

(22) Filed: Apr. 24, 2020

(65) Prior Publication Data

US 2021/0334778 A1  Oct. 28, 2021

(51) Int. Cl.
| | | |
|---|---|---|
| *G06F 1/16* | (2006.01) |
| *G06F 1/26* | (2006.01) |
| *G06Q 20/20* | (2012.01) |
| *G06Q 20/32* | (2012.01) |
| *G07G 1/00* | (2006.01) |
| *H02J 7/00* | (2006.01) |
| *G06F 9/445* | (2018.01) |
| *G06Q 20/34* | (2012.01) |

(Continued)

(52) U.S. Cl.
CPC ......... *G06Q 20/204* (2013.01); *F16M 11/041* (2013.01); *F16M 11/10* (2013.01); *F16M 11/22* (2013.01); *G06F 1/1632* (2013.01); *G06F 1/266* (2013.01); *G06F 9/445* (2013.01); *G06K 7/0013* (2013.01); *G06Q 20/326* (2020.05); *G06Q 20/3223* (2013.01); *G06Q 20/341* (2013.01); *F16M 2200/08* (2013.01); *H02J 7/0042* (2013.01); *H04W 4/80* (2018.02)

(58) Field of Classification Search
CPC ............. G06Q 20/204; G06Q 20/3223; G06F 1/1632; G06F 1/266; G07G 1/0018; H02J 7/0042
USPC .......................................................... 705/17
See application file for complete search history.

(56) References Cited

U.S. PATENT DOCUMENTS

| | | |
|---|---|---|
| 2013/0262248 A1 | 10/2013 | Kim et al. |
| 2013/0264234 A1 | 10/2013 | Cohen |

(Continued)

OTHER PUBLICATIONS

International Application No. PCT/US2021/027695, International Search Report and Written Opinion dated Jul. 22, 2021, 11 pages.

*Primary Examiner* — Toan C Ly
(74) *Attorney, Agent, or Firm* — Haynes and Boone, LLP

(57) ABSTRACT

There are provided systems and methods for a physical stand for multiple device orientations and peripheral card reader. A device stand may include a dock that allows for placement and securing of a computing device within the device case, such as through a locking or connecting mechanism. The device dock further includes a peripheral component, such as a physical card reader, that allows for reading and entry of card data into the computing device for use with an electronic transaction processing application on the computing device. This allows the computing device to process transactions electronic with an online service provider. Further, the device stand includes a hinge or joint that allows for rotating and inverting of the computing device over a curved extension from a base of the device stand, which allows the computing device to be viewed in multiple directions and orientations.

20 Claims, 9 Drawing Sheets

(51) Int. Cl.
  *G06K 7/00*    (2006.01)
  *F16M 11/10*   (2006.01)
  *F16M 11/22*   (2006.01)
  *F16M 11/04*   (2006.01)
  *H04W 4/80*    (2018.01)

(56) References Cited

U.S. PATENT DOCUMENTS

| | | |
|---|---|---|
| 2016/0203466 A1 | 7/2016 | Lamba et al. |
| 2016/0358147 A1 | 12/2016 | Edwards et al. |
| 2017/0140363 A1* | 5/2017 | Hicks .................. G06Q 20/322 |
| 2017/0276289 A1* | 9/2017 | Phillips .................. G06F 21/00 |
| 2017/0300093 A1 | 10/2017 | Hamann et al. |
| 2018/0031172 A1 | 2/2018 | Van Bergen et al. |
| 2018/0060851 A1 | 3/2018 | Govindarajan et al. |
| 2019/0073678 A1 | 3/2019 | Lunn et al. |

* cited by examiner

PHYSICAL STAND FOR MULTIPLE DEVICE ORIENTATIONS AND PERIPHERAL CARD READER

TECHNICAL FIELD

The present application generally relates to physical device stands used for electronic transaction processing through mobile computing devices and more particularly to providing a physical tablet stand that includes a peripheral card reader device and allows for tablet inversion to view the tablet interface from multiple perspectives and/or orientations.

BACKGROUND

Service providers may provide device applications that allow for electronic transaction processing at physical merchant locations through mobile devices of merchants. For example, a service provider may provide a mobile application that allows for entry of items for a transaction, calculation of transaction totals (including tax, tip, and the like), and processing of the transaction with the service provider through network communications. However, when providing these services through mobile devices, the merchant or other employee generally is required to pass the mobile device to the other party to input transaction details, which creates friction in use of the devices. The devices may not be secured when transferred between parties and may be damaged or stolen. Further, any peripheral component added to the device to assist in processing transactions with the service provider is further not secured with respect to the mobile device that may result in movement that causes disconnection and/or damage to the mobile device and the peripheral component.

Figure 1:
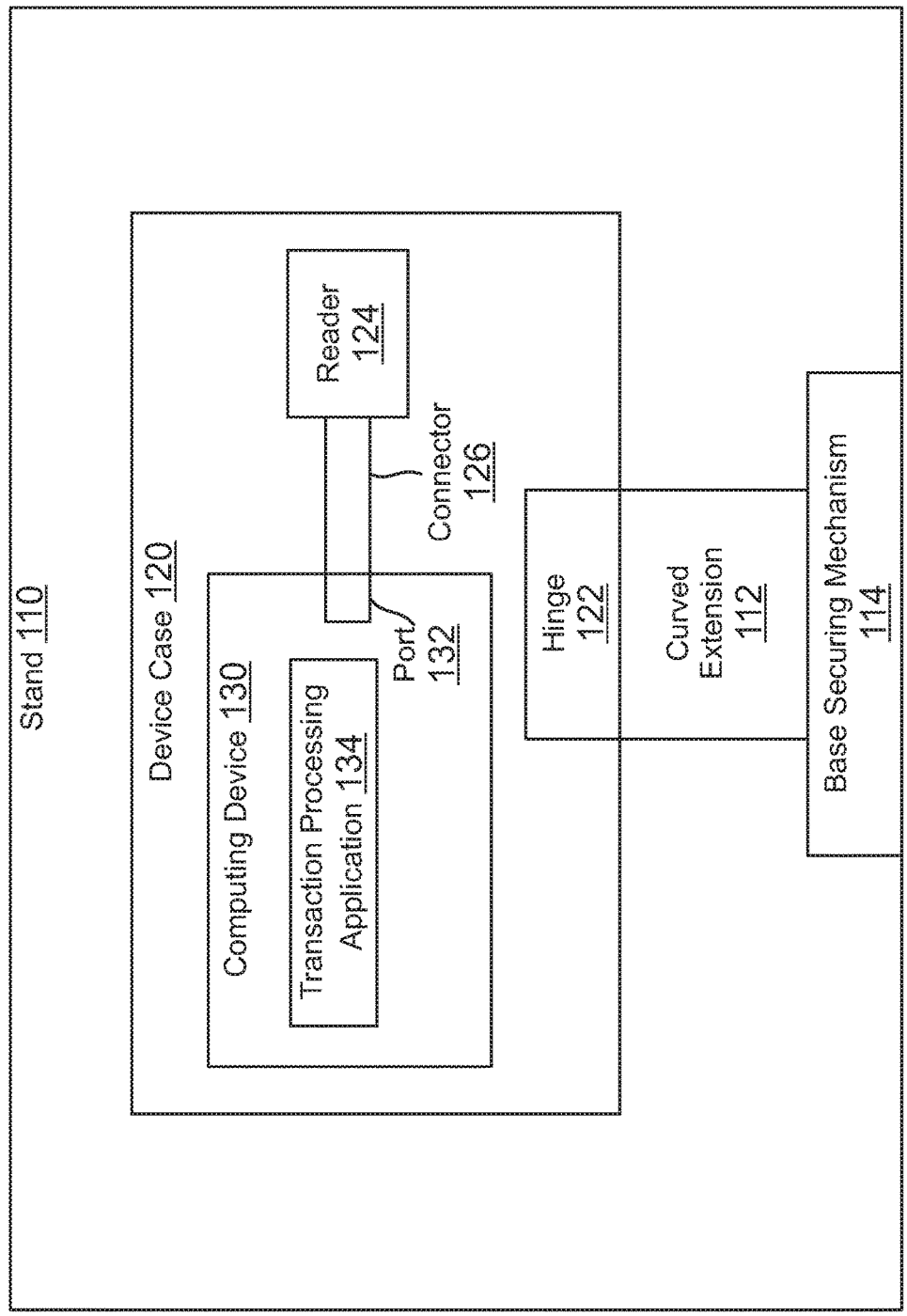
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a physical stand for multiple device orientations and peripheral card reader. Systems suitable for practicing methods of the present disclosure are also provided.

A manufacturer, wholesaler, retailer, or a service provider, such as an online electronic transaction processor or other online entity requiring authentication processes, may provide physical device stands to merchants and other users for use in physical locations, such as a merchant storefront, retail location, and the like. The device stand includes a base that rests on or is secured to a surface with a curved or arcuate extension from the base and away from the surface to a device case or docking portion. The device stand may allow for securing of a computing device, such as a mobile tablet computer or a mobile smart phone, into the device case portion. Further, the device case allows for viewing of an interface, such as a graphical user interface (GUI), in a particular direction or orientation of the device stand. For example, a merchant behind a counter may be able to view a tablet inserted into the device case in one direction, where the tablet may then be inverted over the top of the extension via the hinge so that a customer on the other side of the counter may then view the tablet when inverted. The device case also includes a peripheral component or device, such as a physical payment card reader, that connects to the computing device and allows for input of data to the computing device. In order to accept payment cards, such as credit or debit cards, the device case may include an opening in the device case to insert the payment card to the peripheral, or the peripheral may extend and protrude from a side of the device case to accept the payment card. Thus, the device stand secures a mobile computing device and conveniently allows use of the computing device with different users and in different orientations with a peripheral device.

For example, in order to provide the device stand in a physical manner that secures the computing device from damage and theft, the device stand may include a base that rests on or is secured to a surface, such as a merchant checkout location, point-of-sale, countertop, or the like. The base may form a bottom portion of the device stand and may include a flat portion, legs, or other base shape that allows for resting of the stand on a surface. In some embodiments, the base may include a securing mechanism or component, including screws, adhesive or glue-able portions, latches, clasps, or the like that allows for anchoring and/or securing of the base to the surface on which the device stand is placed. From the base, the device stand extends in an opposite and perpendicular direction (e.g., away from the base) in an extension. In some embodiments, the extension may correspond to a curved, arcuate, or C-shaped extension from the base, such as half or a portion of a circle or oval. This curved extension extends in such a manner that it is connected to the base at one end and is further connected to a device case or docking component that accepts and secures a computing device within a physical body.

Thus, the extension connects at the other end to the device case that include a portion to accept a computing device, including a mobile tablet computer or a mobile smart phone. This may correspond to a dock or docking mechanism to secure the computing device. Thus, the portion for the computing device may correspond to an opening and case that secures the computing device within the body of the device dock. This may also include a mechanism to secure the computing device so that the computing device does not fall out of the device case, such as when the device case is inverted over the curved extension, the device stand is moved or contacted, or the device stand is otherwise manipulated. For example, the device case may include a snap fit mechanism, screws or other connectors, adhesive, magnetic portions, and/or other securing mechanism (e.g., via a sliding mechanism that opens and closes the device dock) that is configured to prevent the computing device from moving within the device case and/or being removed without sufficient force or manipulation by a user.

When the computing device is secured within the device case, the device case may allow for rotating, inverting, or otherwise adjusting an orientation of the computing device so that other users may view an interface (e.g., a screen or display) of the computing device in different directions or perspectives. For example, the device case may connect with the curved extension using a hinge or joint at some place on the body of the device case. The hinge allows for the device case to be rotated over the top of the curved connector. The hinge may be similar to a door hinge, or may correspond to a joint, such as a ball and socket joint, pivot joints, or other connectors that allow movements in two or three dimensions. The device case's hinge or joint may also be capable of being disconnected from the curved extension so that the device case may be removed from the device stand. In this regard, the hinge may include a magnetic or physical detachable connector that allows for the device case to be detached from the curved extension. This may allow the merchant to remove the computing device while secured in the device case from the device stand and allows the merchant to bring the computing device with device case to different areas. The merchant may then reconnect the device case to the extension using the detachable component at a later point to connect the device case to the device stand for use.

In one direction, such as facing a merchant or a customer, the hinge may connect to the top of the curved extension and may cause the computing device's display to face in a direction away from the curvature. Further, a bumper or other stop may be placed so that the device case comes to a rest at a certain orientation and does not allow movement past a certain degree, such as in a full 360 degrees or more than 180 degrees. When rotating the device case over the top of the curvature of the extension, the computing device display may the point in a different direction, such as a generally opposite direction of the first placement so that a second user (e.g., the merchant or consumer) standing across from the first user but facing the first user may also view the computing device's screen. When inverted, the device case and computing device may come to a rest on the back of the curved extension, such as a back of a C-shaped extension. Further, the tablet may be inverted to a sufficient degree that any screen re-orientation, such as the inversion, may be detected (e.g., through an accelerometer within the computing device) and allow for reorienting the interface (e.g., so that the interface does not appear upside-down to the second user).

The device case may also include a portion that contains one or more peripheral components or devices that are connectable to the computing device. The peripheral may correspond to a physical payment card reader, such as a device that may read an EMV chip in a payment card or other data storage mechanism in or on a physical card, such as a credit, debit, gift, or other card. The peripheral therefore includes at least a card reading mechanism and a connector to the computing device. The peripheral device may be contained within the portion of the device case that has enough room for the card reader to connect to the computing device through the connector. In some embodiments, the connector and/or computing device may include hardware and/or software to allow power to flow from the computing device to the peripheral component and provide power to the peripheral component. However, in other embodiments, the device stand, device case, and/or portion of the device case having the peripheral card reader may include additional components, such as a power component and/or supply, which may power the card reader. Once the card reader is connected to the computing device and powered, the card reader may be activated to read card data from physical cards. The card reader may be entirely contained in the portion of the device case such that the device case further includes an opening, such as a slit large enough for entry of the physical card to read card data, in a side of the device case having the card reader. In other embodiments, the card reader may protrude or extend from a side of the card case to allow for reading of card data from physical cards. The slit and/or protrusion may further include a guiding mechanism for entry of physical cards to be read by the card reader.

The portion of the device case having the card reader may also include other components to provide additional functionalities to the device stand. For example, a power connector and/or power supply may be located in the portion of the device case. A direct wired physical power connector may connect to an external power supply, such as a wall power socket, that may provide direct power to the card reader and/or computing device. A power supply self-contained in the portion of the device case may include a rechargeable battery pack or an induction power charger, which may provide power to the computing device and/or card reader. This may allow for both charging of the computing device, as well as powering of the card reader to read card data as necessary. For example, a battery may provide wired power and may be removable, rechargeable, and/or replaceable to provide power. An inductive charger may receive power from an external source (e.g., a wired power plug or other inductive charger) and provide the power either through wired or wireless means (e.g., induction via electromagnetic induction and magnetic fields) to the computing device and/or card reader. Additionally, the portion may include a wireless or wired network adapter, such as a WiFi network adapter that allows connection to a local wireless network, a Bluetooth adapter, a Bluetooth Low Energy adapter or beacon, an NFC reader and/or antenna or the like. In this regard, the network adapter may be configured to store network credentials, which may be automatically loaded to the computing device to allow for connection to a network. Additionally, when the network adapter is disconnected, the credentials may be wiped or deleted from the computing device for additional security measures.

Further, once the card reader is connected to the computing device, the card reader may be used to read card data and transfer the card data to the computing device for processing. In some embodiments, the card reader may activate a mobile application, such as an electronic transaction processing application associated with an online service provider or transaction processor, that may allow for reading and processing of card data, as well as entry of transaction data. After removing the computing device from the device stand and disconnecting from the card reader, the card reader may be powered off or entered to a low power state, and the application on the computing device may be automatically closed or exited. The application may therefore be opened (automatically or by user input) on the computing device and a user, such as a merchant or customer, may input transaction data including items or service for purchase, amounts, other fees (e.g., tax or tip), and the like. Further, payment data, such as payment card details, payment card number, authorization, and/or processing gateway may be provided to the application from a payment card via reading the data from a chip or other component of a physical payment card. The computing device may then use a network connection and communications with the online service provider's platform to process a transaction with the online service provider. Prior to processing transactions, the merchant or other user of the device stand may be required to establish a payment account with the service provider.

Thus, the service provider may provide electronic transaction processing to entities, such as consumers and merchants that may wish to process transactions and payments. In order to establish an account and/or utilize transaction processing services, these different users may be required to establish account credentials, including a password, PIN, or other authentication credential that allows access to the account. An account with a service provider may be established by providing account details, such as a login, password (and/or other authentication credential, such as a biometric fingerprint, retinal scan, etc.), and other account creation details. The account creation details may include identification information to establish the account, such as personal information for a user, business or merchant information for another entity, or other types of identification information including a name, address, etc. The entity may also be required to provide financial information, including payment card (e.g., credit/debit card) information, bank account information, gift card information, benefits/incentives, and/or financial investments, which may be used to process transactions. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

FIG. 1 is a block diagram of a networked system 100 suitable for implementing the processes described herein, according to an embodiment. System 100 includes a stand 110, a device case 120, and a computing device 130. Computing device 130 may be utilized by a user, merchant, business, or another entity to perform some action (e.g., electronic transaction processing). In this regard, stand 110 may facilitate connecting of a card reader to computing device 130 for processing of transactions with a service provider server. Computing device 130 may include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over a network.

Stand 110 in system 100 may correspond to a physical stand that allows for insertion and placement of computing device 110 into device case 120 to secure computing device 130 and allows for use of computing device 130 with a reader 124. In this regard, stand 110 may include multiple different shapes and configurations and include at least a curved extension 112 from device case 120 to a base securing mechanism 114 for a base of stand 110. Curved extension 112 may correspond to a curved, arcuate, or C-shaped extension between base securing mechanism 114 and device case 120 so that base securing mechanism 114 and device case 120 may be joined and in a relative position with each other. Curved extension 112 may extend in a generally perpendicular direction away from base securing mechanism 114 to allow for extension of device case 120, and therefore computing device 130, away from a surface that base securing mechanism 114 is connected to. Curved extension 112 may be a single solid extension or multiple different extensions joining device case 120 to base securing mechanism 114. Further, curved extension 112 may be extendable or may be of sufficient length to cause device case 120 to be at a particular height or level with respect to the surface (e.g., chest or eye level to a merchant when viewing computing device 130 and stand 110 is placed on a surface or countertop). Base securing mechanism 114 may include one or more latches, fasteners, adhesives, or the like, which may allow for resting and/or securing of stand 110 on a surface. However, in other embodiments, base securing mechanism 114 may correspond to a large enough area or base that stand 110 may balance on a surface even when computing device 130 is placed in device case 120.

Device case 120 may correspond to a component of stand 120 that includes a body portion and a device port or dock that allows for docking and securing of computing device 130 within the body of device case 120. Device case 120 can be a case or shell that may cover all or a portion of computing device 130, such as around an external side of computing device 130, and further includes an opening that allows for viewing of a display and interface of computing device 130. The opening further allows use of an input mechanism of computing device 130, such as a touch screen interface, to allow a user, such as a consumer or merchant, to input data and review displayed data. Device case 120 includes a hinge 122 that connects to curved extension 112 and allows for rotating or inverting device case 120 over curved extension 112, base securing mechanism 114, and/or a base of stand 114. This allows computing device 130 secured within device case 120 to be viewed in two or more opposite, perpendicular, or other directions, such as a first direction for a merchant to enter data and a second direction for a costumer to review and confirm transaction details. Hinge 112 may further be detachable through a mechanical or magnetic mechanism to allow for device case 120 to be disconnected from curved extension 112.

Further, within a portion of device case 120 is a reader 124 that may be connected to computing device 130 through a connector 126. Reader 124 may correspond to a physical payment card reader that may read and determine card data stored on a mechanism of a physical card, such as an EMV card reader, NFC chip reader, or another chip or storage component reader (e.g., magnetic stripe). Reader 124 may be included all within device case 120 and therefore device case 120 may have an opening to allow of insertion of the physical card to device case 120 for reading of the card by card reader 124. Reader 124 may also protrude from a portion of device case 120 so that reader 124 extends from a side and is capable of reading physical cards. Connector 126 may serve to provide power to reader 124, such as from computing device 130 or an external source. Further, connector 126 may include one or more one or more wired or data transmission tunnel components to exchange data between reader 124 and/or computing device 130.

Connector 126 may then connect to computing device 130 via a port 132, such as a USB or micro-USB connection port, a Lightning port, a 3.5 mm input jack, or another port that may allow for connection of reader 124 to computing device 130. Port 132 may therefore exchange power and/or data with connector 126 and therefore reader 124. Computing device 130 may be implemented as a communication device that may utilize appropriate hardware and software configured for wired and/or wireless communication with reader 124 and a service provider server. For example, in one embodiment, computing device 130 may be implemented as a personal computer (PC), a mobile smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although only one device is shown, a plurality of devices may function similarly and/or be connected to provide the functionalities described herein.

Computing device 130 may further include one or more applications, which may be used for processing data with the online service provider server. The applications may be used for electronically processing transactions, as well as performing other data processing operations. In some embodiments, transaction processing application 134 may include services for electronic transaction processing provided by the service provider server, which may be performed using an account for a merchant, transaction data input to computing device 130, and/or payment card data input via reader 124. Transaction processing application 134 may be used to establish the account, which may be done by providing user and/or device information, establishing an account identifier and authentication credential, and/or registering financial information for the account. Transaction processing application 134 may also be used to access the account and perform electronic transaction processing for payments to or from the account using transaction data input to computing device 110. During transaction processing, transaction processing application 134 may be utilized to select one or more accounts and/or payment instruments for use in processing a transaction, transfer, or other financial process.

As discussed herein, transaction processing application 134 may receive user financial information, such as credit card data, bank account data, or other funding source data, from reader 124. Additionally, transaction processing application 134 may utilize a digital wallet associated with the account with a payment provider or transaction processor, such as the service provider server, as the payment instrument, for example, through accessing a digital wallet or account. Transaction processing application 134 may also be used to receive a receipt or other information based on transaction processing. Further, transaction processing application 134 may be automatically opened and/or closed when connection to reader 124 is detected or ended, respectively, via port 132 and connector 126. Computing device 130 may also include at least one network interface component adapted to communicate with the service provider server. In various embodiments, the network interface component may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Further, transaction processing application 134 may receive one or more credentials for reader 124 for the network via connector 126.

FIGS. 2A-D are an exemplary apparatus 200 for a device stand having an invertible device case and a peripheral component contained within or protruding from a side of the device case, according to embodiments. Apparatus 200 of FIGS. 2A-D includes a stand 110 as discussed in reference to system 100 of FIG. 1. Thus, apparatus 200 includes device case 120 that accepts and secures computing device 130 discussed in reference to system 110.

Figure 2A:
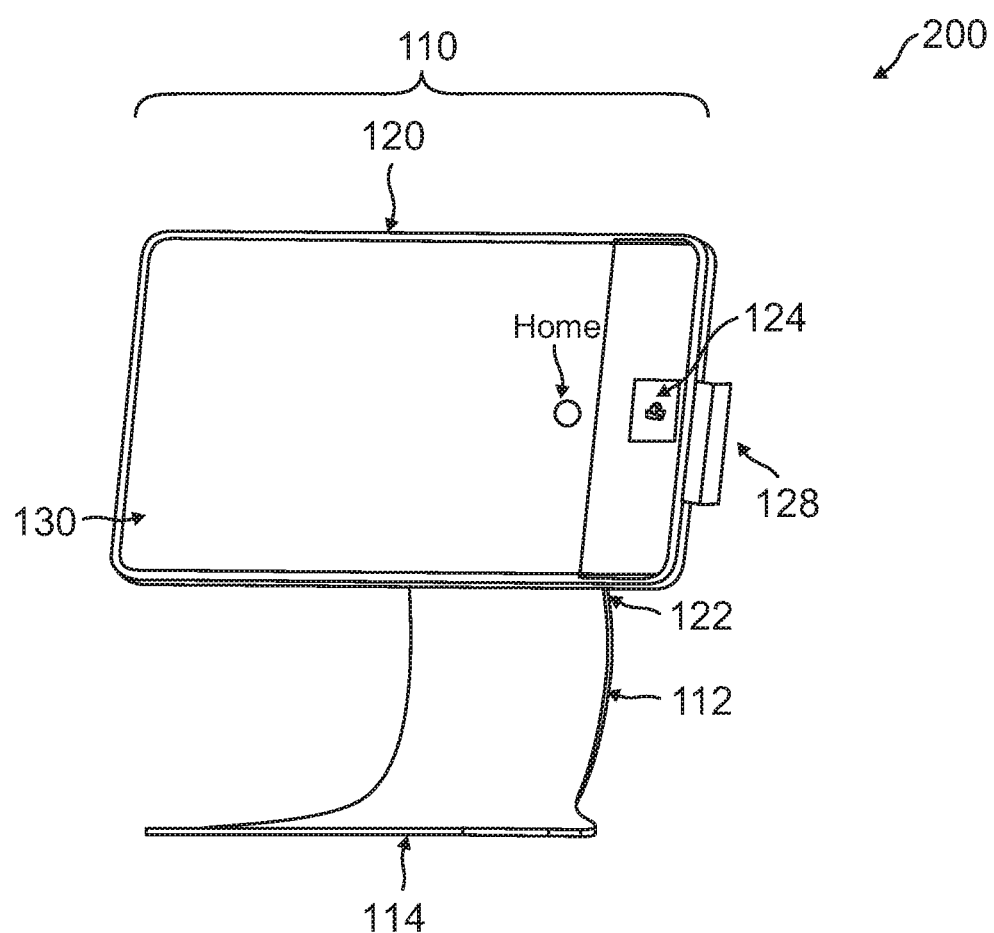
FIGS. 2A-D are an exemplary apparatus for a device stand having an invertible device case and a peripheral component contained within or protruding from a side of the device case, according to embodiments.
Figure 2B:
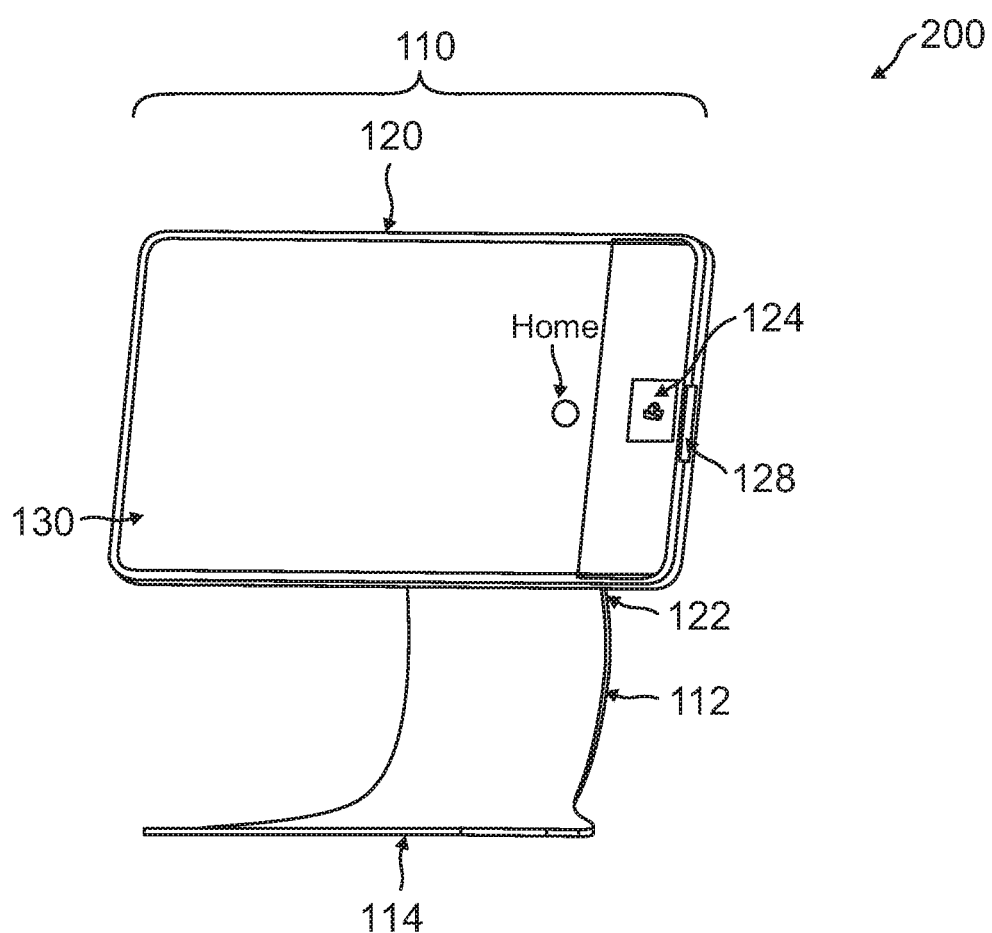
Figure 2C:
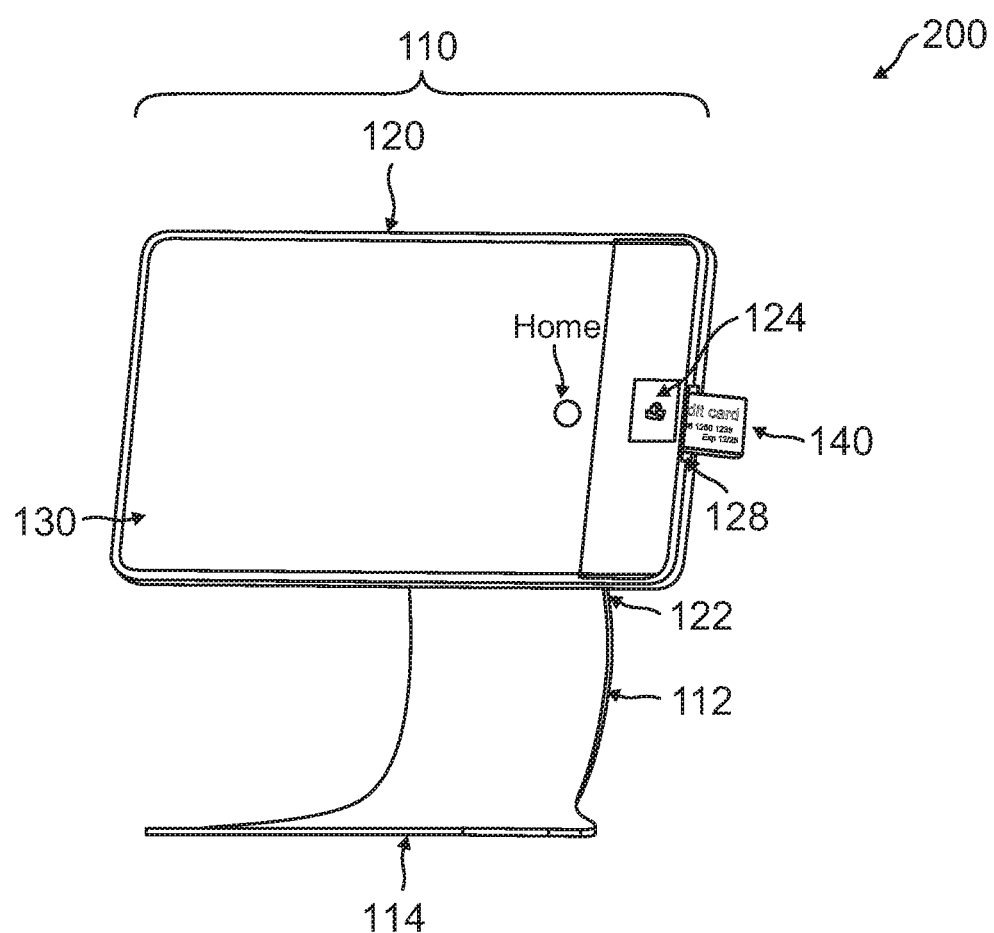
Figure 2D:
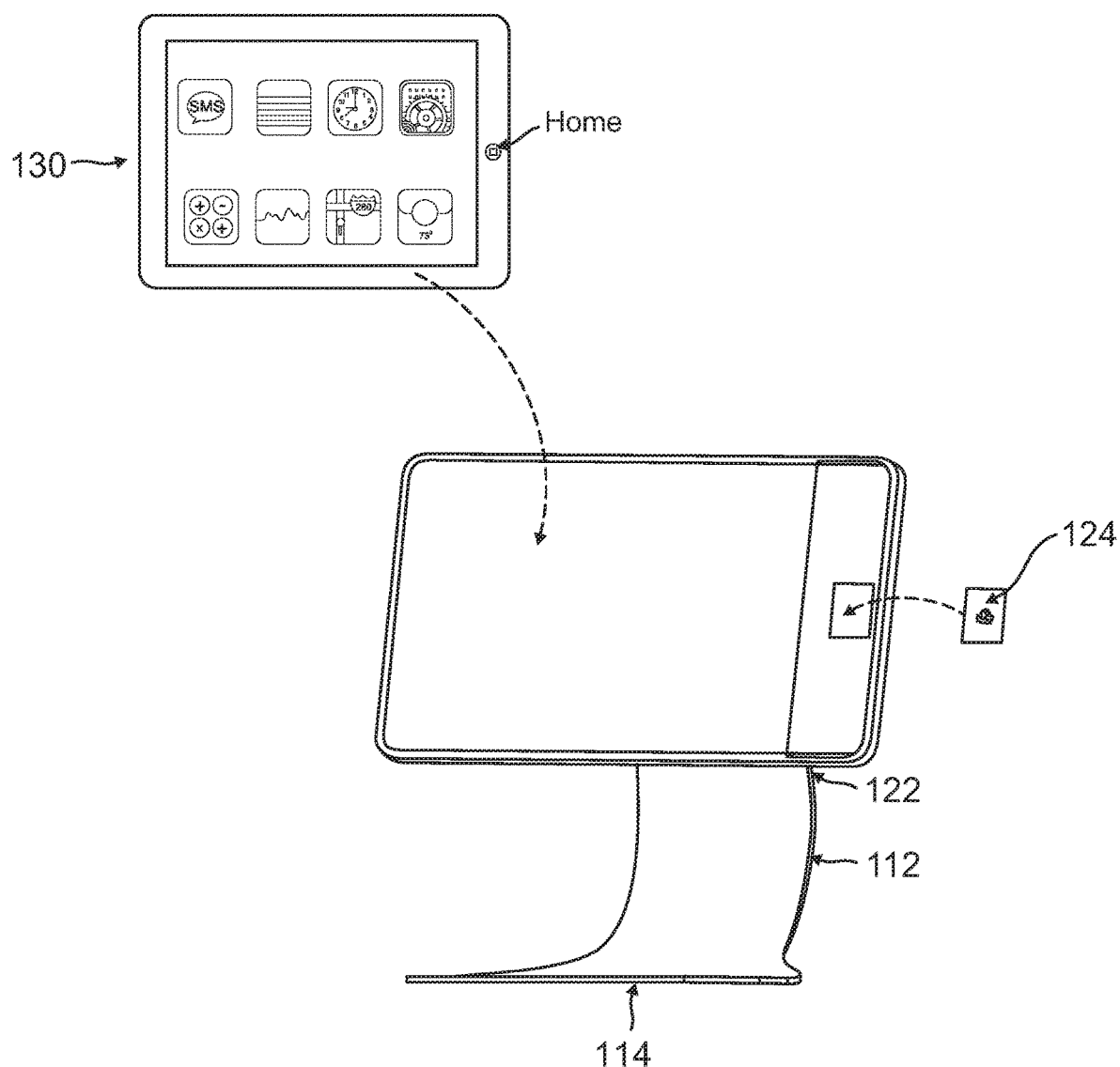

In this regard, apparatus 200 in FIG. 2A displays an embodiment of the shape and configuration of stand 110 having reader 124 with card acceptor 128 protruding from a side of device case 120. In FIG. 2B, the embodiment of apparatus 200 is shown with a configuration where card acceptor 128 is an opening or slit in the side of device case 120. In FIG. 2C, the embodiment of apparatus 200 is shown where card acceptor 128 is accepting a physical payment card to be read by reader 124. In FIG. 2C, card acceptor 128 may include a guide, opening, and/or protrusion from device 120 thereby allowing a user, such as a merchant or customer, to insert a physical payment card into reader 124 for reading of card data. FIG. 2D shows apparatus 200 having device case 120 accepting a computing device 130 and a reader 124 that is a portion of device case 120.

In FIGS. 2A-C, device case 120 is shown with reader 124 within a portion on a right side of device case 120, where reader 124 may be connected to computing device 130 through a mechanical mechanism, connector, and/or port when computing device 130 is inserted into device case 120. This portion of device case 120 may be a separated portion so that sufficient space and area may be provided for reader 124, such as an EMV chip reader. In FIG. 2A, device case 120 is shown with a card acceptor 128 that may correspond to an opening, extension, and/or protrusion from device case 120. Card acceptor 128 may include a guide for inserting a physical card, such as a payment card, into device case 120 so that reader 124 may read card data from the card. Thus, in FIG. 2A, card acceptor 128 forms a protrusion from the side of device case 120, which may include the guide and/or all or a portion of reader 124. This allows for insertion of a card by a user so that reader 124 may read card data and transmit the card data to computing device 130. Card acceptor 128 may therefore be shaped with an opening the same or about the same size as a standard credit or debit card to allow for insertion and guiding of the card into reader 124 through the protrusion of card acceptor 128. In FIG. 2A, reader 124 may extend from a side of device case 120 having card acceptor 128 to provide for additional room or extension to properly house and utilize reader 124 with card acceptor 128 and computing device 130 in device case 120. In FIG. 2B, reader 124 may be entirely contained within device case 120, such as the right portion of device case 120 so that reader 124 and card acceptor 128 no longer protrude from a side of device case 120. Therefore, in FIG. 2B, an opening, slit, or other aperture is formed in the side of device case 120 to allow for insertion of a card into device case 120. This card acceptor 128 in FIG. 2B may be the same or about the same size (e.g., a small amount larger) than a standard credit or debit card to allow for insertion and guiding of the card into reader 128. In FIG. 2C, card acceptor 128 is shown as accepting a payment card 140 into the side of device case 120 having reader 124. Thus, in FIG. 2C, payment card 140 is inserted into reader 124 through card acceptor 128 in such a manner so as to allow reading of card data from payment card 140 by reader 124 and transmission of the card data to computing device 130.

In FIG. 2D, stand 110 is shown with an exemplary computing device 130, such as a tablet computer, inserted into a body of device case 120 so that computing device 130 may be viewed in a particular direction. This may be accomplished by a user generally placing and securing computing device 130 within a body of device case 120.

When inserting computing device 130 into device case 120 of stand 110, different insertion and securing mechanism may be utilized. For example, a snap fit design may be utilized where portions of device case 120 may be flexible or semi-flexible to allow for securing of computing device 130 within a body of device case 120. In such embodiments, device case 120 may include a lip securing mechanism that may snap over and fit computing device 130 within the body of device case 120, similar to a mobile device cover and/or case protector. However, other mechanism may also be used in combination or separately from a snap fit design, such as screws that allow for screwing a panel or portion over computing device 130, a slide lock that may slide a panel or portion over computing device 130, one or more magnets within device case 120, and/or one or more screws that may be compatible with computing device 130.

Reader 124 may be manufactured to be a portion of device case 120 and therefore contained within the portion of device case 120 so that it is not removable. However, as shown in FIG. 2D, the portion containing reader 124 may be opened and/or removed so that reader 124 is detachable from device case 124. In such embodiments, reader 124 may be connected to device case 120 through one or more mechanisms, such as a latch, clasp, screw, snap fit, or other securing and fastening mechanisms that allow for reader to be connected to computing device 130 through device case 120. Moreover, stand 110 is shown having a base securing mechanism 114 that corresponds to a base portion that may rest on a surface, such as a merchant countertop, table, or the like. Base securing mechanism 114 therefore allows balancing of stand 110 on the surface and use of computing device 130 within device case 120 when stand 110 is placed on the surface.

As shown in apparatus 200 of FIGS. 2A-D, curved extension 112 extends away from base securing mechanism 114 and is shown as curved, extending from one side of a base of stand 110 and curving upwards in a C-shape or curved/arcuate direction. This allows for curved extension 112 to connect to a back portion of device case 120, such as a center of a back panel of device case 120. The connection may be facilitated by a hinge or joint, such as hinge 122 in system 100. Hinge 122 may therefore be connected in between curved extension 112 and device case 120. This allows for inversion or rotating of device case 120 over curved extension 112 so that in one direction, device case 120 may direct a display interface of computing device 130 away from the C-shape or curve. However, when inverted, device case 120 may come to a rest on a back of the C-shape or curve and may allow another user to view computing device 130 in an opposite direction.

Figure 3:
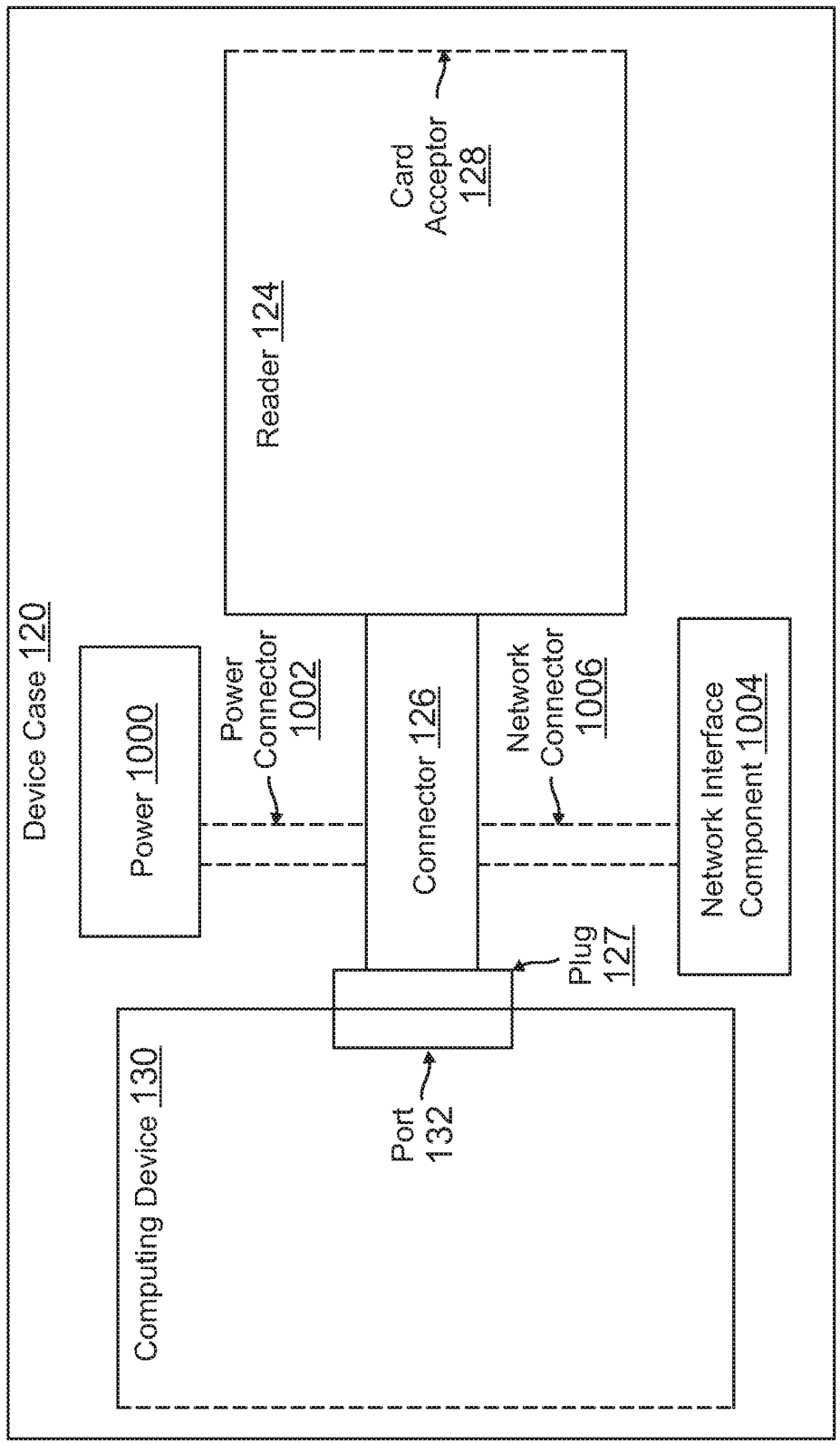
FIG. 3 is an exemplary system showing a connection between a computing device and a peripheral component within a device case, according to an embodiment.

FIG. 3 is an exemplary system 300 showing a connection between a computing device and a peripheral component within a device case, according to an embodiment. In this regard, system 300 shows computing device 130 within device case 120, as discussed in reference to system 100 of FIG. 1. Computing device 130 therefore executes one or more applications and operations associated with the components of device case 120.

In system 300, an internal portion of device case 120 is shown for stand 110 in system 100. Device case 120 is shown with a portion that contains the peripherals and components that are connectable to computing device 130. Also while various components and peripherals are shown in system 300, it is understood, that more, less, or different components may also be contained in one or more portions of device case 120. In this regard, device case 120 is shown with computing device 130 inserted into device case 120 so that computing device 130 is secured within a body or structure of device case 120. Device case 120 may further include a snap fit, magnetic lock, screw, or adhesive that may allow for the securing of computing device 130 so that computing device 130 does not move within and/or fall out from device case 120.

After insertion of computing device 130 into device case 120, port 132 of computing device 130 may be connected to connector 126. This may occur when computing device 130 is secured within device case 120 and/or through a connecting mechanism, such as a slide fit or cover and causes connector 126 to be inserted to ports 132. Port 132 may connect to connector 126 via a plug 127, such as a micro-USB, Lightning, or other connector for plug 127. Connector 126 and plug 127 may include one or more wired connectors and/or wired tunnels to allow for power and/or data to be exchanged between computing device 130 and reader 124. In this regard, connector 126 and plug 127 may be utilized with an application or operation of computing device 130 that allows for power to flow in an opposite direction out of computing device 130 (e.g., from computing device 130) and therefore provide power to reader 124. Additionally, connector 126 and plug 127 include data transmission components to exchange data between reader 124 and computing device 130, such as a signal that computing device is ready to read card data from a physical card or is not ready, a status of reader 124 and/or computing device 130, and/or payment card data read from a card chip or component. In other embodiments, connector 126 may correspond to a wireless connector, including Bluetooth, RFID, radio wave, and the like, which may exchange data between reader 124 and computing device 130. Thus, plug 127 may be unnecessary where a wireless connection is used for data transfer. When reading card data, device case 120 is further shown with card acceptor 128 that may serve to allow an opening or protrusion to insert a card to reader 124, which may be contained in a side of a body of device case 120 or extend from that side.

Further, device case 120 is shown with other optional components, including a power source 1000 and a network interface component 1004. Power source 1000 corresponds to a wired or wireless power component or supply, such as a connection to an external power supply (e.g., battery, generator, 120V/240V wall plug, inductive charger, or the like) or an internal power supply (e.g., a rechargeable or replaceable battery, induction power coils and wireless power charger, or the like). Power source 1000 may provide power directly to computing device 130 for charging of computing device 130. In further embodiments, power source 1000 provides power to connectors 126, via power connector 1002, which may provide power to one or more of reader 124 and/or computing device 130. For example, power connector 1002 may be used to provide power to operate reader 124 and/or charge computing device 130. Thus, power connector 1002 and/or connector 126 may include a power splitter to split power between different component of device case 120, including a network interface component 1004.

Network interface component 1004 may correspond to a module to connect to an external network, such as a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices. Network interface component 1004 may connect to computing device 130 to provide network capabilities via a network connector 1006, which may correspond to a wired or wireless connector. Further, network interface component 1004 may additionally provide network access credentials, such as a WiFi username/password, when computing device 130 is inserted into device case 120 and/or connector 126.

Figure 4A:
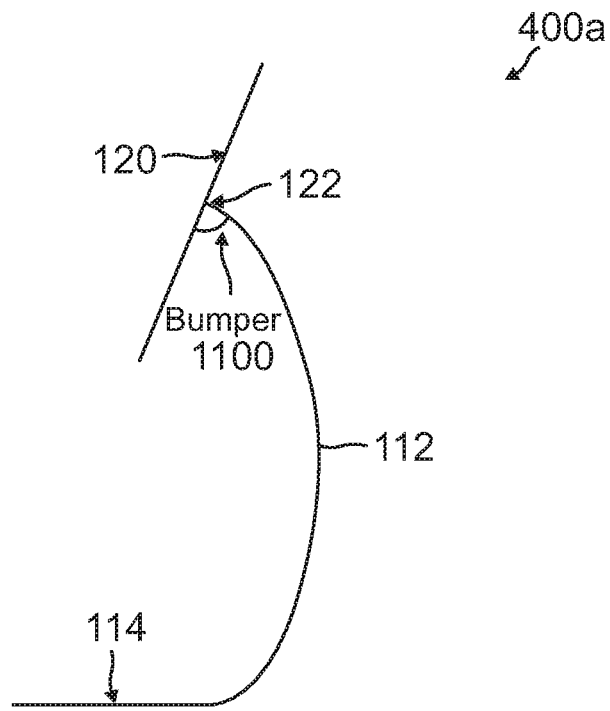
FIGS. 4A-B are different orientations of a computing device within a device stand using a rotatable joint or hinge, according to embodiments.
Figure 4B:
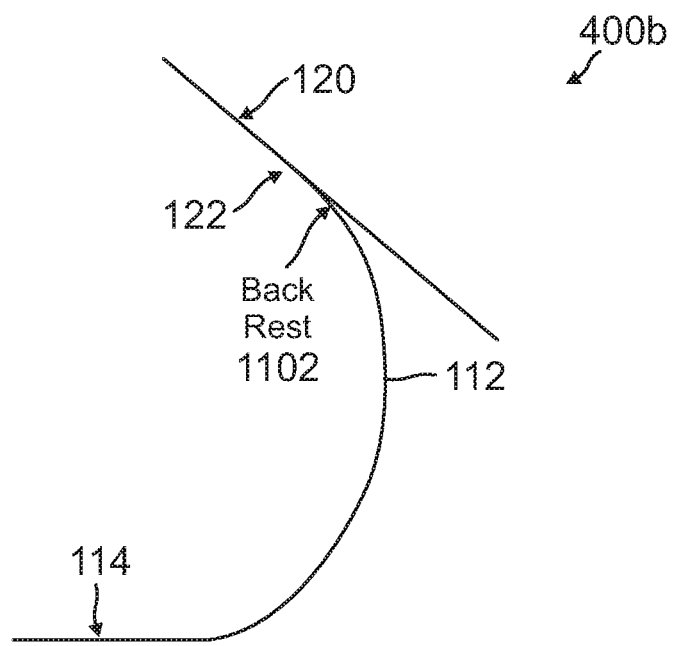

FIGS. 4A-B are different orientations of a computing device within a device stand using a rotatable joint or hinge, according to embodiments. For example, in an environment 400a, a first orientation of stand 110, as discussed in system 100 of FIG. 1, is shown with device case 120 facing a first direction in the first orientation to allow for a first user (e.g., a merchant or customer) to view a computing device in device case 120 from a first left-side perspective of environment 400a. In an environment 400b, a second orientation of stand 110 is shown with device case 120 facing a second direction in the second orientation to allow for a second user to view the computing device in device case 120 from a second right-side perspective of environment 400b.

In environment 400a of FIG. 4A, stand 110 is shown with base securing mechanism 114 on a surface with curved extension 112 extending up to meet device case 120 at a hinge 122. When hinge 122 is in a first placement and configuration, device case 120 is facing in the first orientation and direction. Thus, an opening and/or computing device (e.g., computing device 130) may be visible to the first user that may be standing on the left-side of environment 400a. This may allow a merchant to begin entry of transaction details, such as items, services, costs, and/or fees into a transaction processing application. Further a bumper 1100 is shown under hinge 122 so that device case 120 may come to a rest in a first position. Bumper 1100 may be optional depending on the configuration and mechanism of hinge 122 so as to allow resting of device case 120 against bumper 1100 when turned or rotated to the first orientation. This may be utilized to prevent device case 120 from rotating too far around hinge 122, thereby facing towards the base of stand 110. Moreover, the bumper may be utilized to prevent additional stress and/or damage to hinge 122. Bumper 1100 may therefore correspond to some physical or mechanical mechanism to cause the first orientation of environment 400a. However, in other embodiments, bumper 1100 may correspond to other securing mechanisms or may be unnecessary. For example, hinge 122 may cause device case 120 to rest in the first position and orientation, or another portion of device case 120 may otherwise be provided to allow for stopping and resting of device in the first position without causing damage to hinge 122.

In environment 400b of FIG. 4B, stand 110 is also shown with base securing mechanism 114 on a surface with curved extension 112 extending up to meet device case 120 at a hinge 122. However, in contrast to environment 400a, stand 110 in environment 400b display the second orientation of device case 120 when device case 120 is rotated and inverted over curved extension 112 and base securing mechanism 114 using hinge 112. Instead, device case 120 comes to a rest in an opposite second direction where a second user may view device case 120 (and the corresponding inserted computing device) from the second right-side perspective in environment 400b. This allows another user to view and interact with device case 120 and the computing device. Further, in order to utilize the computing device, device case 120 comes to a rest on back rest 1102, which corresponds to a back portion of curved extension 112. For example, back rest 1102 may correspond to a back of a C-shape of curved extension 112 to allow for resting of device case 120 and use of the computing device contained within device case 120.

Thus, hinge allows for free motion in at least two dimensions, and may further include further joints to move freely in three dimensions over a motion range. Stand 110 may further include other orientations and positions of device case 120.

Figure 5:
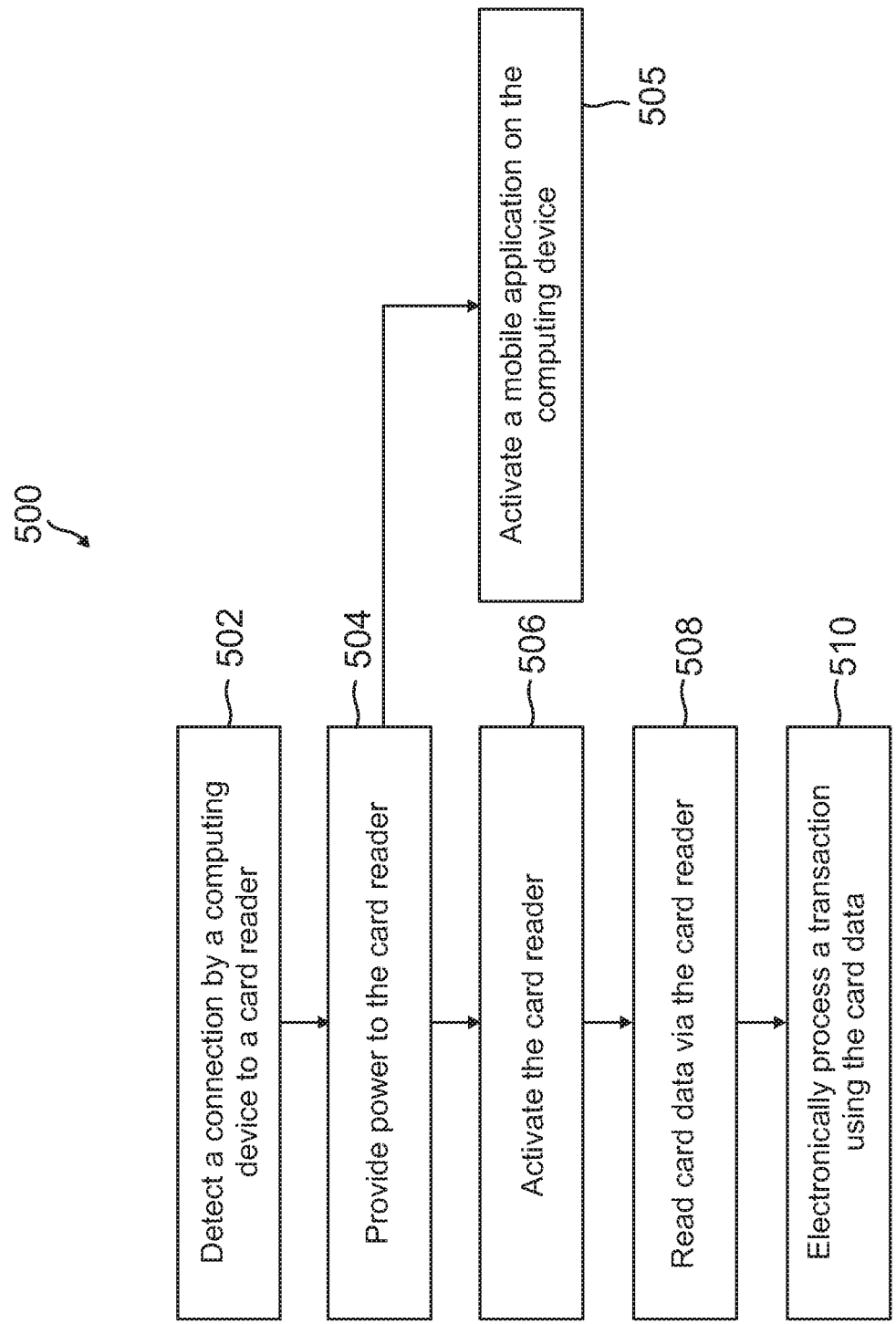
FIG. 5 is an exemplary flowchart for connecting and utilizing a computing device with a device stand, according to an embodiment.

FIG. 5 is an exemplary flowchart 500 for connecting and utilizing a computing device with a device stand, according to an embodiment. Note that one or more steps, processes, and methods described herein of flowchart 500 may be omitted, performed in a different sequence, or combined as desired or appropriate.

At step 502 of flowchart 500, a connection by a computing device to a card reader is detected, such as a mobile tablet device or a mobile smart phone when placed within a stand having a device case or dock that allows for securing of the computing device within a body of the case. The connection may correspond to a physical wired connection, such as through micro-USB or Lightning ports, or may be a wireless connection. The connection may be facilitated when the computing device is accepted to the device case and may allow for data exchange, as well as power to be provided to the card reader. In response to the connection occurring between the computing device and the card reader, at step 504, power is provided to the card reader. The power may be provided directly from the computing device to the card reader or may come from an external power supply to the card reader. Where the power is provided by the computing device, a process on the computing device may facilitate reversing a power flow direction so that power may flow from the computing device to the card reader.

An optional step 505 may further occur after power is provided to the card reader, for example, where the powering of the card reader causes a mobile application on the computing device to activate. This may include executing and opening or bringing to a forefront of an operating system on the computing device. By opening the application, additional operations may be performed to facilitate data exchanges between the computing device and the card reader, such as to read card data from physical payment cards. At step 506, the card reader is activated within the device case and stand. Activating the card reader may include performing operations that allow for the card reader to communicate with the computing device, read card chips or other components, and communicate data to the computing device. In some embodiments, the computing device may also activate a light or signal on the card reader that displays a card reader status, such as a light indicating the card reader is active and capable of reading card.

At step 508, card data is read, via the card reader. This may occur when a card is placed through an opening or aperture in a side of the device case where the card reader is located or inserted into the card reader if the card reader extends from a protrusion of the device case. The card data may be read using an EMV chip reader or other physical card reader, including NFC or RFID readers, magnetic stripe readers, and the like. The card reader may also include configurations to comply with card reading standards, such as EMV chips and chip readers. Thereafter, the card data is transmitted to the computing device and, at step 510, a transaction is electronically processed using the card data. In some embodiments, processing the card data may require the card reader to provide additional information, such as security keys or other encryption information necessary for the card reader standard, to the computing device. Moreover, after the computing device is removed from the device case, the card reader may be deactivated and entered into a no or low power mode.

Figure 6:
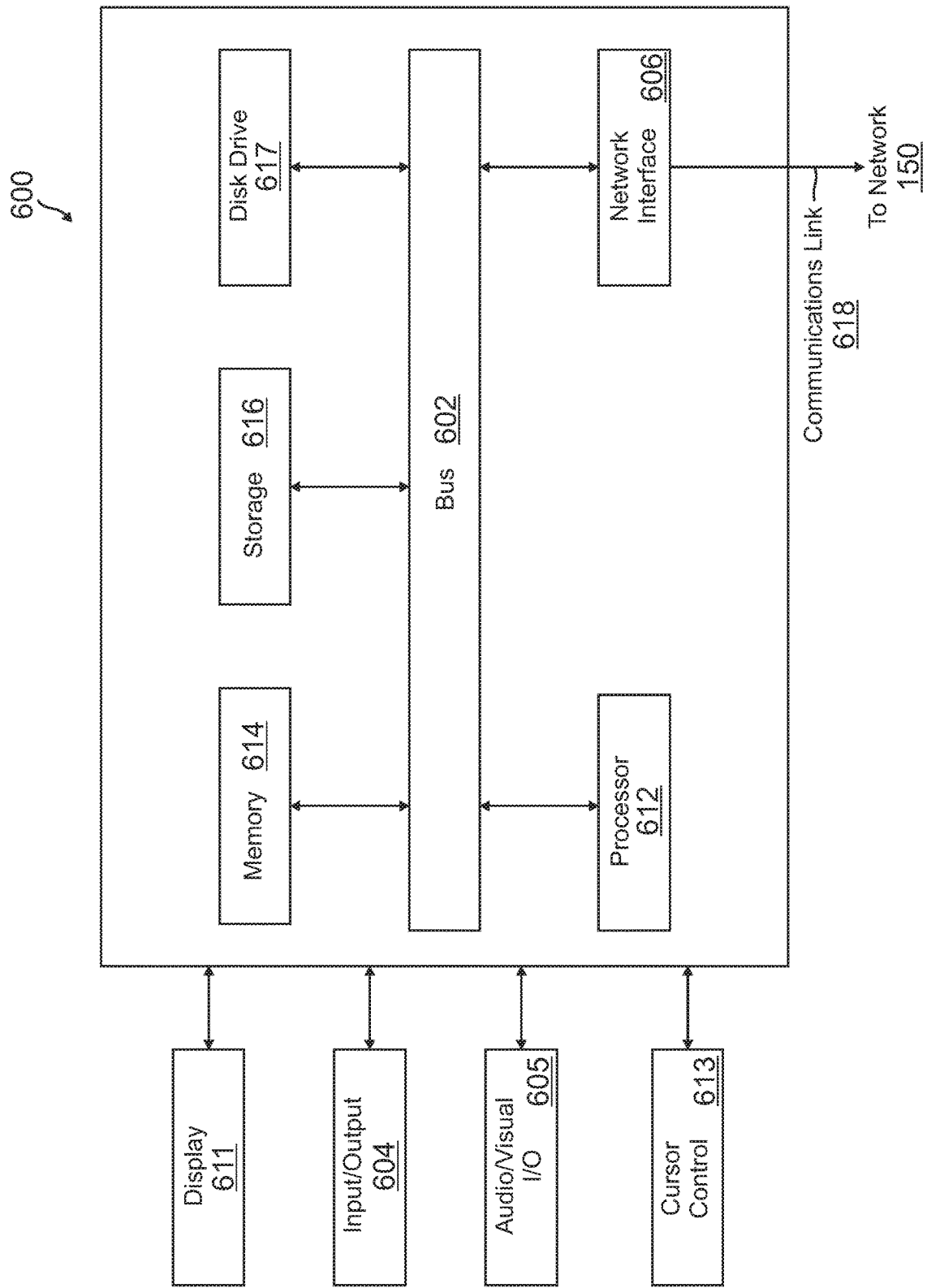
FIG. 6 is a block diagram of a computer system suitable for implementing one or more components in FIG. 1, according to an embodiment.

FIG. 6 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A device stand comprising:
   a base comprising an extension in a direction perpendicular from the base;
   a device docking case connected to the base via the extension, the device docking case configured to accept a mobile computing device, and the device docking case comprising an opening for insertion of a payment card or an opening for a protrusion of a portion of the payment card reader component from the device docking case;
   a rotatable joint connecting the extension and the device docking case, the rotatable joint configured to: enable the device docking case to rotate over the extension, enable the device docking case to rotate and rest in a position facing a first direction away from the extension, and enable the device docking case to rotate and rest against a back curvature facing a second direction; and the payment card reader component at least partially within the device docking case, the payment card reader component configured to accept the payment card for reading of data stored on the payment card, the payment card reader component comprising one or more hardware processors configured to execute instructions to cause the payment card reader component to perform operations comprising:
  detecting a physical connection of the payment card reader component to the mobile computing device, wherein the physical connection causes power to be provided to the payment card reader component from the mobile computing device;
  connecting to the mobile computing device for data communications via the physical connection; and
  activating the payment card reader component for reading the payment card.

2. The device stand of claim 1, wherein the payment card reader component comprises an EMV chip reader, a device interface, and a connector between the EMV chip reader and the device interface, wherein the detecting the physical connection comprises receiving the power to the EMV chip reader via the connector.

3. The device stand of claim 2, wherein the device interface comprises at least one of a micro-USB adapter interface or a Lightning adapter interface.

4. The device stand of claim 2, wherein the connector further comprises a power connector component within the payment card reader component, and wherein the device interface provides the power from the mobile computing device to the EMV chip reader via the power connector component.

5. The device stand of claim 2, wherein the payment card reader component comprises a power circuit splitter that receives the power from one of an external power supply or an internal power supply of the device stand, and wherein the power circuit splitter provides the power to the EMV chip reader and the mobile computing device for charging the mobile computing device.

6. The device stand of claim 1, wherein the base further comprises a curved portion or an arcuate portion connecting the extension to a bottom of the base, and wherein the bottom of the base is configured to be placed on or secured to a surface.

7. The device stand of claim 1, wherein one of the device docking case or the rotatable joint comprises one of a magnetic release or a mechanical release configured to enable the device docking case to be removed from or connected to a curved portion between the extension and a bottom of the base.

8. The device stand of claim 1, wherein the device docking case comprises one of a snap fit securing mechanism, a slide lock, or at least one screw configured to secure the mobile computing device inside or against the device docking case.

9. The device stand of claim 1, further comprising:
  a power supply configured to provide the power from an external power source, the power supply comprising one of a wired power supply or an inductive power supply.

10. The device stand of claim 9, wherein the power supply is further configured to enable charging the mobile computing device or providing the power to the payment card reader component.

11. The device stand of claim 1, wherein the operations further comprise:
  reading, by the payment card reader component, data stored on the payment card; and
  communicating the data to the mobile computing device for transaction processing.

12. The device stand of claim 1, wherein the operations further comprise:
  in response to activating the payment card reader component, causing an application on the mobile computing device to open, wherein the application is associated with reading the payment card by the payment card reader component.

13. The device stand of claim 1, further comprising a bumper that limits a movement of the rotatable joint connecting to the extension to a field of range for the device stand.

14. A computing device docking system comprising:
  a first structure comprising a curved component and configured to provide a surface attachment at a first end and a rotatable hinge connector at a second end; and
  a second structure configured to encapsulate at least a portion of a computing device and secure the computing device within the second structure, wherein the second structure attaches to the rotatable hinge connector and comprises a physical card reader, wherein the second structure comprises the physical card reader in one of a body of the second structure with a physical card acceptance slot in a side of the body or a protrusion from the side of the body, and wherein the physical card reader comprises one or more hardware processors configured to execute instructions to cause the physical card reader to perform operations comprising:
    establishing a data connection to the computing device when the computing device is secured within the second structure and connected to the physical card reader;
    reading data from a card chip of a physical card; and
    processing the data with the computing device,
  wherein the curved component comprises a shape corresponding to one of a C letter, a portion of an oval, an arc, or a portion of a circle, and wherein the rotatable hinge connector enables the second structure to be inverted over the first structure and enables viewing of the computing device in opposite directions.

15. The computing device docking system of claim 14, wherein the establishing the data connection occurs via a micro-USB adapter or a Lightning adapter.

16. The computing device docking system of claim 14, wherein the second structure further comprises a power connector between the computing device and the physical card reader, and wherein the power connector enables a power to flow in a direction from the computing device to the physical card reader based on an operation executable by the computing device.

17. The computing device docking system of claim 14, wherein the data connection comprises a wireless data connection using one of Bluetooth, Bluetooth Low Energy, or near field communications.

18. The computing device docking system of claim 14, further comprising a bumper that limits a field of movement of the first structure and the second structure using the curved component.

19. A method comprising:
  detecting, by a physical card reader component, a placement of a tablet computing device within a tablet case of a curved tablet stand, wherein the physical card reader component is attached to at least a portion of the tablet case;

detecting that the tablet computing device has been inverted to rest on a back portion of a curvature of the curved tablet stand based on data from one or more sensors of the tablet computing device;

determining that the tablet computing device is in a position, based on detecting the tablet computing device has been inverted to rest on the back portion of the curvature, to accept card data via a chip reader of the physical card reader component;

activating, based on the determining, the chip reader of the physical card reader component;

receiving the card data from a physical card via the chip reader; and processing the card data with the tablet computing device.

20. The method of claim 19, wherein the detecting the placement comprises receiving power by the physical card reader component from the tablet computing device, and wherein prior to the receiving the card data, the method further comprises:

activating a transaction processing application on the tablet computing device, wherein the processing the card data comprises transmitting the card data to the transaction processing application.

\* \* \* \* \*